F. D. CRANE.
ARTICLE SUPPORT FOR SOLIDIFIED ALCOHOL CANS.
APPLICATION FILED SEPT. 28, 1916.
1,277,872.
Patented Sept. 3, 1918.
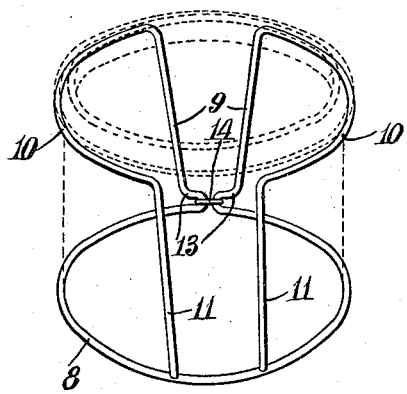
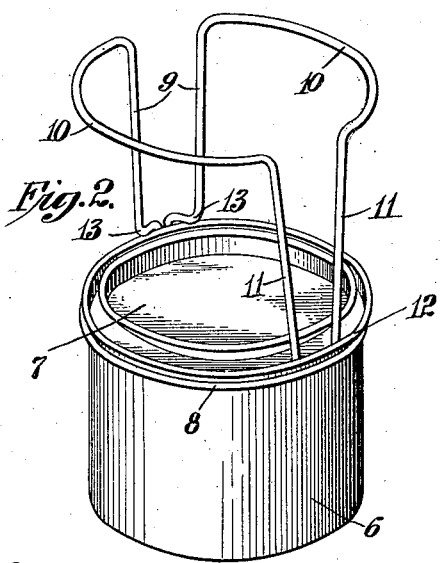
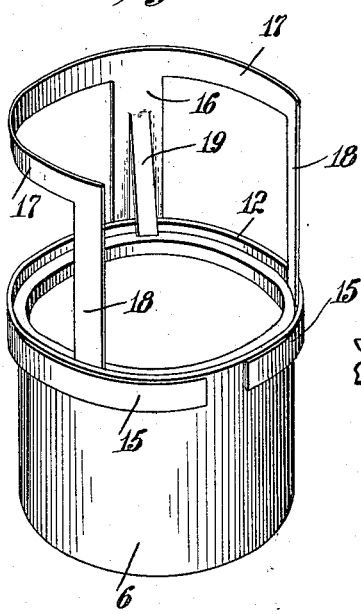
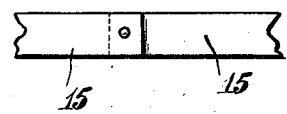
WITNESSES:
INVENTOR.
Frederick D. Crane,
BY Ralph N. Flint
ATTORNEY

UNITED STATES PATENT OFFICE.

FREDERICK D. CRANE, OF MONTCLAIR, NEW JERSEY.

ARTICLE-SUPPORT FOR SOLIDIFIED-ALCOHOL CANS.

1,277,872.

Specification of Letters Patent.  Patented Sept. 3, 1918.

Application filed September 28, 1916. Serial No. 122,670.

*To all whom it may concern:*

Be it known that I, FREDERICK D. CRANE, a citizen of the United States, and a resident of Montclair, in the county of Essex and State of New Jersey, have invented certain new and useful Improvements in Article-Supports for Solidified-Alcohol Cans, of which the following is a specification.

My invention relates to stands or supports designed for use with receptacles or containers in which the heating material commonly known and referred to as "solidified alcohol" is packed and placed upon the market, the purpose of the stand being to support the dish, cooking utensil, or other article or thing to be heated above the container, and to also support the container itself; so that the container will be held in proper position beneath the article to be heated and the latter will be supported a short distance above the container, in order that the flame of the burning alcohol may act effectively thereupon. Alcohol in the form above referred to provides a concentrated and convenient source of heat, and is much used by campers, travelers and others who may require a convenient and quickly available source of heat, it being only necessary to remove the cover of the receptacle and apply a lighted match to the surface of the solidified alcohol, as is well understood. It will further be appreciated that some form of supporting device or stand for supporting whatever is to be heated by the burning alcohol is a desirable accessory for use with a receptacle containing the product in question, as the user is thereby relieved of the necessity of holding the article being heated over the flame.

Heretofore the usual practice in schemes involving the use of solidified alcohol for heating purposes has been to provide a stand which performs the double function of holding the can or receptacle containing the solidified alcohol and at the same time supporting the article to be heated in proper position above the receptacle. Such stands, however, are more or less complicated in construction, and there being no permanent connection or association between the stand and the receptacle, the two are separated from one another when packed for transportation and the stand is likely to be lost. Furthermore, the stand itself takes up considerable room when not in use, and considerable time is required to properly adjust the stand and place the receptacle in proper position within or upon it preparatory to use and to perform the reverse operation when the user is through using the device and the parts are to be disassembled and packed for transportation.

As distinguished from the above and in accordance with my invention supporting means for the receptacle or container itself is dispensed with, and a supporting member or supporting device for the cooking utensil or article to be heated is provided which is permanently associated with and carried by the receptacle, so that the two will not become separated from one another in the ordinary use of the device. The supporting member carried by the receptacle as stated is, in addition, movable vertically relative to the receptacle, in order that when in an extended position the article to be heated will be supported at a proper distance above the receptacle, while when in a collapsed condition the receptacle and supporting member will occupy substantially the same space as the receptacle itself; every part of the supporting member lying in close contact with the receptacle when the device is not in use and is packed for transportation or storage, as will hereinafter appear.

While I refer to the supporting member as being permanently associated with and carried by the receptacle containing the solidified alcohol, this statement is intended to express the idea that a single supporting member is adapted to be used with a receptacle as long as any of the solidified alcohol shall remain therein, which will ordinarily provide for several separate and independent uses of the combined device for heating purposes as the quantity of solidified alcohol contained in receptacles of the size most commonly found upon the market is sufficient to burn for some hours. After the entire contents of the receptacle has been consumed the same may be removed from the supporting member and a new one substituted therefor, thus providing for the use of a single supporting member with several containers. However, the supporting member is of such construction that its cost is extremely small so that there will be no considerable waste if a supporting member is provided for each separate container and both are thrown away when the contents of the same shall have been consumed.

My invention contemplates and includes a container and a supporting member of the kind above referred to in combination, as well as the supporting member *per se* and apart from the container; and the object thereof is to provide a device of the kind or class in question and wherein the features of advantage above enumerated will be secured. A further object of my invention is to provide a supporting member for the article to be heated which will be simple in construction, easy to manufacture, and the cost of which will be extremely small; and to provide a supporting member which will be convenient to use, effective for the purpose or end in view, and which will take up practically no room when not in use and when packed for storage or transportation.

With the above and other objects in view, my invention consists in the supporting member, and in the combined supporting member and receptacle illustrated in the accompanying drawing and hereinafter described and claimed, and in such variations and modifications thereof as will be obvious to those skilled in the art to which my invention relates.

Referring now to the drawing accompanying and forming a part of this application:—

Figure 1 is a view illustrating one form of my improved supporting device in perspective, together with a receptacle for containing a heating material in dotted lines, the support being shown in its lowermost position relative to the receptacle;

Fig. 2 is a similar view showing the receptacle in full lines, and the support in the extended position it occupies when in use;

Fig. 3 is a view similar to Fig. 2 but showing a modified form of my invention;

Fig. 4 is a fragmentary view showing a part of what is shown in Fig. 3 from a position behind said figure; and;

Fig. 5 is a fragmentary view illustrating a modified form of one of the features of the form of my invention shown in Fig. 3.

In the drawing, and referring first to the form of supporting member illustrated in Figs. 1 and 2, the reference numeral 6 designates a receptacle adapted to contain a heating material such, for example, as solidified alcohol hereinbefore mentioned, and 7 designates a slip cover adapted to close an opening in the top of the same as is usual in ordinary types of tin cans, the cover being removed when the alcohol is to be ignited and replaced when the user has finished a heating operation in order to preserve the unconsumed remainder of the heating material for future use, as will be understood; an ordinary eight ounce can such as may be purchased in the open market containing enough solidified alcohol to burn for three or four hours, which is longer than the device will ordinarily be used for a single heating operation.

The form of my improved supporting member illustrated in Figs. 1 and 2 is made from a single piece of wire bent to provide a lower annular portion 8 which extends about the receptacle and fits somewhat loosely thereupon, so that the supporting member as a whole may be readily moved vertically upon or relative to the receptacle and made to occupy the extreme positions shown in the two figures here referred to without becoming disengaged from the receptacle as it is moved from one position to the other.

Extending upward from the annular portion 8 and formed by bending the piece of wire from which the support is made are two upwardly extending members 9, 9, which together form an arm, from the upper or free end of which two supporting members 10, 10, extend; and which last mentioned members serve as the immediate support for the dish, cooking utensil, or other article to be heated, as will be understood. These article supporting members are located over and above the annular portion 8, and extend in a general horizontal direction so that their plane is approximately parallel with the plane of the annular portion; and they may be of any appropriate form or shape but are preferably curved in outline as shown, in order that they will lie outside of the flame of the burning alcohol and thus, to a considerable extent at least, be unexposed to the heating action of the flame, and in order that a sufficiently extended and stable support will be provided for the article to be heated.

Extending downward from the free ends of the article supporting members 10, 10, are two strut members 11, 11, which terminate at about the plane of the annular portion 8, and the lower ends of which strut members rest upon the upper end of the receptacle when the supporting member is in its uppermost position. These strut members, as well as also the upwardly extending members 9, 9, above referred to, will be made of such length that the article being heated will be supported at such a distance above the receptacle that the flame of the burning alcohol will act thereupon most effectively, which distance will obviously vary in receptacles of different sizes; and may also depend upon and vary with the use to which the device is to be put, and upon the character of the article which it is contemplated will be heated most frequently. Cans in which solidified alcohol is commonly packed have an upwardly extending ledge or flange 12, extending about the periphery of the upper end, and, when the supporting member is in use, the lower ends of the strut members lie within or back of said flange and are thus kept from springing out and becoming disengaged from the top of the can or receptacle, as will be understood from Fig. 2 of the drawing.

The supporting member as a whole is vertically movable upon and with reference to the receptacle, but remains in permanent engagement or association therewith, as above explained, and said member is locked in its uppermost position shown in Fig. 2, by means of two latches 13 formed by bending the upwardly extending portions 9 substantially as shown, which latches snap over the edge of the rim 12 at the upper end of the cam when the support is in its uppermost position; and the said upwardly extending portions are tied together adjacent their lower ends by twisting or looping them together or otherwise as by means of a clip or ring 14.

It will be appreciated that the supporting member as a whole is quite resilient, because of the structural features thereof hereinbefore enumerated, and that the lower ends of the struts 11 may be disengaged from the flange 12, and the latches forced downward past the upper edge of said flange when the supporting member is to be moved downward and into the position shown in Fig. 1; and that when the supporting member is in its lowermost or collapsed condition all of its parts lie close to the walls of the receptacle and the receptacle and supporting member occupy approximately the same space as the receptacle alone. Also, while the supporting member is in a sense permanently connected with the receptacle, the latter may be readily moved upward between the article supporting members 10 and removed from the supporting member, and a new can of solidified alcohol substituted therefor. However, it will be appreciated that the supporting member is of such a construction that it costs very little, so that each can may be provided with a supporting member and both discarded when the contents of the can is used up, if desired.

In Figs. 3 to 5, my improved supporting member is shown as formed preferably from a single piece of sheet metal, stamped or cut to proper form and bent to conform with the can; and as comprising a lower portion made up of two tongues 15, 15, which embrace and are vertically movable upon the receptacle, and the free ends of which may be either connected with one another as shown in Fig. 5, or unconnected as shown in Fig. 3. Extending upwardly from the receptacle engaging portion thus formed is an arm 16 which carries article supporting means at its upper end and shown as made up of two curved extensions 17, 17, similar in form, construction, and purpose to the members 10, 10, hereinbefore referred to, and from the free ends of which strut members 18, 18, similar to the strut members 11 extend downward and rest upon the upper end of the receptacle and back of the flange 12.

In the form of my invention illustrated in Figs. 3 to 5 the supporting member as a whole is held and locked in its uppermost position by means of a tongue 19 cut free from the material of the arm 16 and sprung inward, so that its lower end may rest upon the upper end of the receptacle, as shown; and the said member may be moved downward after the tongue has been moved outward so as to disengage it from the upper end of the can, and after the lower ends of the strut members 18 are disengaged from the flange 12, as will be understood. Finally, the can may be moved upwardly between the curved extensions 17, and removed from the supporting member, and said member placed upon and used with a new can, or a supporting member may be used with a single can only and discarded with the can, the same as in the form of my invention first above referred to and described.

Having thus described and explained my invention, I claim and desire to secure by Letters Patent:—

1. A supporting member adapted for use with a receptacle containing a heating material and comprising a lower annular receptacle encircling portion, an arm extending at right angles to the plane of said annular portion, article supporting means carried by and located at the free end of said arm and over said annular portion, and locking means located adjacent the lower end of said arm and adapted to engage the upper end of the receptacle with which the supporting member is used.

2. A supporting member adapted for use with a receptacle containing a heating material and comprising a lower annular receptacle encircling portion, an arm extending at right angles to the plane of said annular portion, article supporting means carried by and located over said annular portion and having downwardly extending strut members adapted to rest upon the upper end of the receptacle with which the supporting member is used, and locking means located adjacent the lower end of said arm and adapted to engage the upper end of the receptacle aforesaid.

3. A supporting member adapted for use with a receptacle containing a heating material and formed from a single piece of wire bent to provide a lower annular receptacle encircling portion, two upwardly extending members, two horizontally extending article supporting members located over said annular portion, and two downwardly extending strut members located one at the free end of each of said article supporting members and the lower ends of which terminate adjacent the plane of said annular portion and are adapted to rest upon the upper end of the receptacle with which the supporting member is used, said upwardly extending members being bent to provide locking means adapted to engage the upper end of the receptacle aforesaid.

4. The combination with a receptacle adapted to contain a heating material, of a vertically movable supporting member carried by said receptacle and comprising an annular receptacle encircling portion in sliding engagement with said receptacle, an arm extending at right angles to the plane of said annular portion, article supporting means carried by said arm and extending over said receptacle, and locking means carried by said supporting member and adapted to engage the upper end of said receptacle to thereby hold said supporting member in its uppermost position.

5. The combination with a receptacle adapted to contain a heating material, of a vertically movable supporting member carried by said receptacle and comprising an annular receptacle encircling portion in sliding engagement with said receptacle, an arm extending at right angles to the plane of said annular portion, article supporting means carried by said arm and extending over said receptacle, a downwardly extending strut member carried by said article supporting means and adapted to rest upon the upper end of said receptacle when the supporting member is in its uppermost position, and locking means adapted to engage the upper end of the receptacle to thereby hold said supporting member in its uppermost position.

6. In a device of the class described, and in combination with a receptacle adapted to contain a heating material, a vertically movable supporting member carried by said receptacle and comprising an annular receptacle encircling portion in sliding engagement with said receptacle, an upwardly extending arm connected at its lower end with said annular portion, article supporting means carried by said arm and located at the upper free end thereof, downwardly extending strut members carried by said article supporting means and adapted to rest upon the upper end of said receptacle when the supporting member is in its uppermost position, and locking means located adjacent the lower end of said arm and adapted to engage the upper end of the receptacle to thereby hold said supporting member in its uppermost position.

In testimony whereof, I have signed my name to this specification this 22nd day of September, 1916.

FREDERICK D. CRANE.

Copies of this patent may be obtained for five cents each, by addressing the "Commissioner of Patents, Washington, D. C."